United States Patent
Hoy

(12) 
(10) Patent No.: US 6,511,687 B2
(45) Date of Patent: *Jan. 28, 2003

(54) EDIBLE ANIMAL GREETING CARDS AND TREATS

(76) Inventor: Stephen Hoy, 26575 Oakland St., Roseville, MI (US) 48066

(*) Notice: Subject to any disclaimer, the term of this patent is extended or adjusted under 35 U.S.C. 154(b) by 0 days.

This patent is subject to a terminal disclaimer.

(21) Appl. No.: 10/095,510
(22) Filed: Mar. 12, 2002
(65) Prior Publication Data
US 2002/0090420 A1 Jul. 11, 2002

Related U.S. Application Data

(63) Continuation-in-part of application No. 09/540,776, filed on Mar. 31, 2000, now Pat. No. 6,355,285, which is a continuation of application No. 08/817,278, filed as application No. PCT/US96/13070 on Aug. 6, 1996, now Pat. No. 6,063,412.
(60) Provisional application No. 60/001,957, filed on Aug. 7, 1995.

(51) Int. Cl.[7] .............................................. A22C 17/00
(52) U.S. Cl. ........................ 426/87; 426/104; 426/805
(58) Field of Search .......................... 426/87, 104, 805; 40/124.09, 124.11; 281/4, 15.1, 17, 19.1

(56) References Cited

U.S. PATENT DOCUMENTS

| | | | |
|---|---|---|---|
| 259,915 A | 6/1882 | Pratt | 281/19.1 |
| 722,418 A | 3/1903 | Bach | 281/27 |
| 919,736 A | 4/1909 | Loesch | |
| 1,265,926 A | 5/1918 | Ludlam | 426/104 |
| 1,791,175 A | 2/1931 | Tomlinson | 426/132 |
| 2,012,545 A | 8/1935 | Pickering et al. | 281/19.2 |
| 2,353,594 A | * 7/1944 | Seagren | 426/87 |
| 2,911,304 A | * 11/1959 | Wenger | 426/87 |
| 3,107,651 A | 10/1963 | Beck | 426/104 |
| 3,548,527 A | 12/1970 | Acosta et al. | 40/152.1 |

(List continued on next page.)

FOREIGN PATENT DOCUMENTS

| | | |
|---|---|---|
| DE | 2703900 A1 | 8/1978 |
| DE | 2834647 A1 | 2/1980 |
| DE | 4010003 | 2/1991 |
| EP | 337537 | 10/1989 |
| JP | 63-291538 | 11/1988 |
| WO | WO 95/01735 | 1/1995 |
| WO | WO 95/04471 | 2/1995 |

OTHER PUBLICATIONS

R. Bolton, P. Moore, "1985 Christmas Cards are as Individualized as the People who Send Them," Hallmark 1985.
R. Bolton, P. Moore, "Pets and Babysitters Will Get Cards Along with Mom, Dad and Kids This Christmas," Hallmark, 1985.
"Crazy for Cats, Daffy Over Dogs," Hallmark New Tips, Aug. 1994.
Deposition Transcript of R. J. Simmons, Dec. 19, 2000.

(List continued on next page.)

*Primary Examiner*—Nina Bhat
(74) *Attorney, Agent, or Firm*—Gifford, Krass, Groh, Sprinkle, Anderson & Citkowski, PC

(57) ABSTRACT

Greeting cards and other items to be enjoyed by animals and pets combine an article composed of a non-toxic material which is typically chewable or fully consumable and digestible, in conjunction with a greeting that may include a graphical image (i.e., of an animal, pet, and/or pet owner), a textual message, or both. An edible greeting card embodiment assumes the form of a panel having a thickness, a perimeter, and front and back surfaces and at least one message on one or both of the front and back surfaces using and edible colorant or other medium. In embodiments utilizing two or more such panels or construction elements, joining means are provided in the form of a flexible strip threaded through holes, an edible adhesive or flexible edible hinge. Alternate embodiments may be suspended from a cage rail by a hook, wire. While selected embodiments of the invention may be constructed of a single substance such as rawhide, alternate embodiments may be constructed from a variety of ingredients including Nylabone, grains, minerals and seeds. The ingredients will generally vary depending on the animal for which the greeting article is intended.

17 Claims, 4 Drawing Sheets

U.S. PATENT DOCUMENTS

| | | | | |
|---|---|---|---|---|
| 3,589,047 A | | 6/1971 | Hess | 40/124.1 |
| 3,908,025 A | | 9/1975 | Miller et al. | 426/623 |
| D240,770 S | | 8/1976 | French | D1/1 |
| D241,184 S | | 8/1976 | French | D1/1 |
| 4,024,287 A | * | 5/1977 | Golchert | 426/383 |
| 4,203,516 A | | 5/1980 | Stonoga et al. | 206/216 |
| 4,212,896 A | | 7/1980 | Brown, Jr. et al. | 426/623 |
| 4,362,746 A | | 12/1982 | Cox | 426/104 |
| 4,578,273 A | * | 3/1986 | Krubert | 426/87 |
| D288,062 S | | 2/1987 | Aronson | D9/332 |
| 4,670,271 A | | 6/1987 | Pasternak | 426/90 |
| 4,681,758 A | | 7/1987 | Fruthaler et al. | 424/78 |
| 4,822,626 A | | 4/1989 | Spanier et al. | 426/805 |
| 5,011,642 A | | 4/1991 | Welygan et al. | 264/167 |
| 5,017,394 A | | 5/1991 | Macpherson | 426/302 |
| 5,021,802 A | | 6/1991 | Allred | 346/1.1 |
| 5,035,907 A | | 7/1991 | Phillips et al. | 426/383 |
| 5,047,231 A | | 9/1991 | Spanier et al. | 426/57 |
| D322,281 S | | 12/1991 | English | D19/6 |
| 5,089,307 A | | 2/1992 | Ninomiya et al. | 428/35.2 |
| 5,133,496 A | | 7/1992 | Davidson et al. | 229/92.8 |
| 5,211,980 A | | 5/1993 | Cox | 426/601 |
| 5,284,365 A | | 2/1994 | Stuart | 283/117 |
| 5,296,217 A | | 3/1994 | Stookey | 424/57 |
| 5,346,710 A | | 9/1994 | Geitner | 426/115 |
| 5,435,840 A | | 7/1995 | Hilborn | 106/20 R |
| 5,453,122 A | | 9/1995 | Lyon | 106/20 R |

OTHER PUBLICATIONS

Sunday Star Magazine, Washington, D.C., Gaines Dog Biscuit Advertisement, Dec. 1955.

Full Text From Dialog Database, Money Magazine, vol. 16, p. 125, "Catering to the Educated Palates of Yuppies Yelpers", Aug. 1987.

Swiss Colony Christmas Gift Book, 1982.

Swiss Colony Christmas Catalogue, 1979.

"27 Facts about the Pampered Pet Mark," Giftware News, Mar. 1990 (author unknown).

* cited by examiner

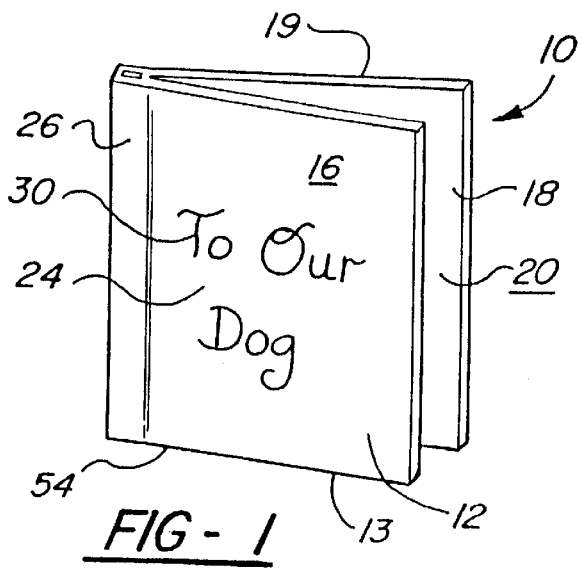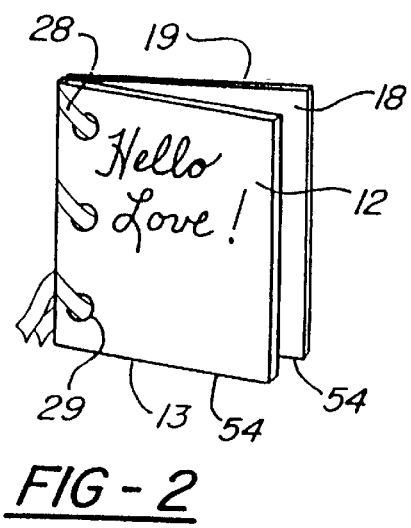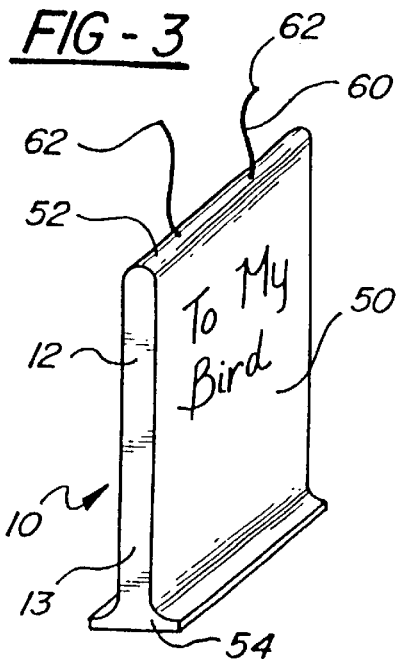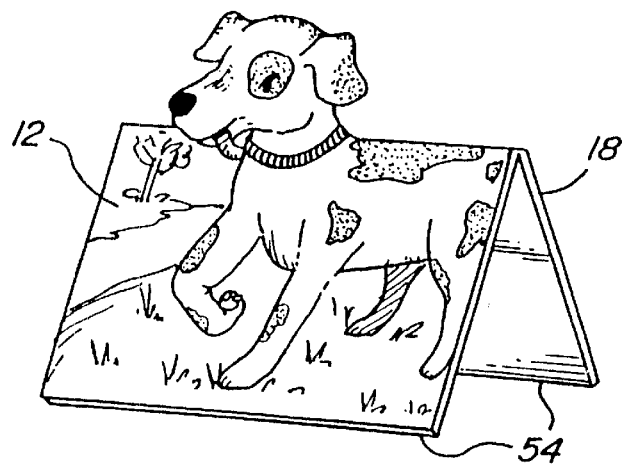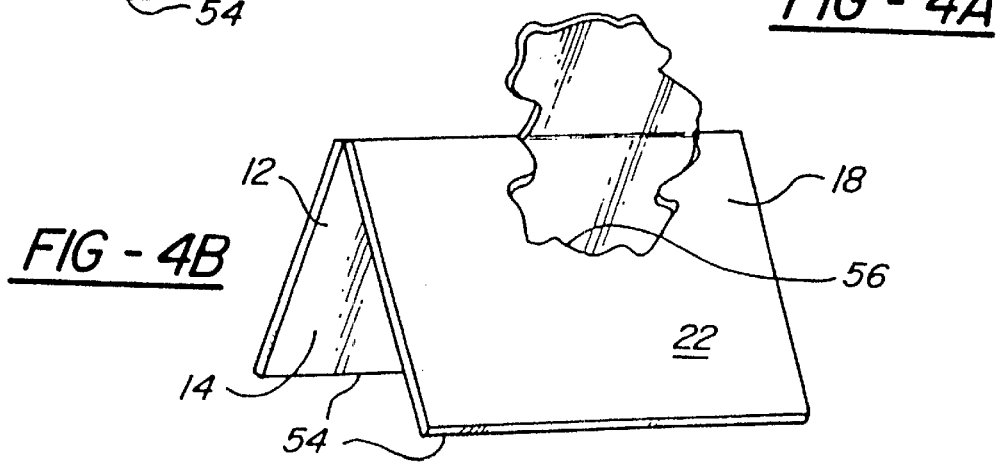

EDIBLE ANIMAL GREETING CARDS AND TREATS

REFERENCE TO RELATED APPLICATIONS

This application is a continuation-in-part of U.S. patent application Ser. No. 09/540,776, filed Mar. 31, 2000 now U.S. Pat. No. 6,355,285, which is a continuation or U.S. patent application Ser. No. 08/817,278, filed Apr. 10, 1997, now U.S. Pat. No. 6,063,412, which is the U.S. national phase of PCT application No. US96/13070, filed Aug. 6, 1996, which claims priority of U.S. provisional application Ser. No. 60/001,957, filed Aug. 7, 1995, the entire contents of all of which are incorporated herein by reference.

FIELD OF THE INVENTION

The present invention relates generally to novelty items for animals, and more particularly to edible greeting cards and other treats for pets.

BACKGROUND OF THE INVENTION

Many families have pets which are increasingly treated as members of the family. Many pet owners enjoy including their beloved pets in holiday festivities such as birthdays, Christmas, Easter, Valentine's Day, Thanksgiving, and Halloween. As greeting cards are traditionally given to loved ones on such holidays, many pet owners give greeting cards to their pets or send greeting cards from themselves or their pets to the pets of relatives and close friends.

A variety of patents disclose greeting cards which include gifts or where the card itself may be construed as a gift. U.S. Pat. No. 4,203,516 to Stonoga et al. discloses a novelty greeting card wherein a dog biscuit is contained within a non-edible greeting card particularly configured to hold the dog biscuit. The greeting card disclosed by Stonoga et al. requires the pet owner to remove the pet treat from its protective pocket within the non-edible greeting card prior to ingestion by the pet.

U.S. Pat. No. 5,284,365 to Stuart discloses a greeting card assembly having a removable insert containing a message. The message insert, once removed from the greeting card, may be kept as an ornament such as a Christmas tree ornament or other similar decorative item.

U.S. Pat. No. 3,589,047 to Hess discloses a novelty greeting card comprising a substantially three-dimensional caricature which is collapsible onto a base sheet. The caricature is inflated by blowing air into the caricature through a hole in the base sheet, thus providing a three-dimensional gift in a substantially flat greeting card.

U.S. Pat. No. 5,133,496 to Davidson et al. discloses a combination greeting card and gift pouch. A single sheet is tri-folded into a closed pouch, with adhesive provided along the margins of the sheet, thereby enabling the pouch to be sealed and mailed as a greeting card.

U.S. Pat. No. 3,548,527 to Acosta et al. discloses a card having a pivotable rear panel whereby a photograph or other picture may be placed within the card to attractively mount the photo or picture.

Several U.S. patents disclose items which are ingestible by animals, such as U.S. Pat. No. 4,681,758 to Fruthaler et al., which discloses shaped, flavored articles which are attractive to masticating animals and have the texture, appearance and aroma of natural food materials. U.S. Pat. No. 4,265,916 to Skoch discloses an animal feed supplement in block form. U.S. Pat. No. 4,777,058 to Chandler discloses a composite animal food having a crunchy shell surrounding a deformable core of edible protein and water soluble solids.

Despite these items and associated available products, the need nevertheless remains for edible greeting cards and other treats for animals, including domesticated animals and pets.

SUMMARY OF THE INVENTION

The present invention is broadly directed to greeting cards and other items to be enjoyed by animals and pets, including products that are suitable for chewing and/or ingestion. In each case, the article combines an article composed of a non-toxic material which is typically chewable or fully consumable and digestible, in conjunction with a greeting that may include a graphical image (i.e., of an animal, pet, and/or pet owner), a textual message, or both.

For example, according to a first preferred embodiment, an edible greeting card suitable for ingestion by a pet such as a horse, dog, cat, rabbit or bird assumes the form of a panel having a thickness, a perimeter, and front and back surfaces. At least one message is provided on one or both of the front and back surfaces using and edible colorant or other medium.

In embodiments utilizing two or more such panels, edible joining means are provided so that one edible panel may be joined to another edible panel, creating a joined structure which may stand upright on a horizontal surface. In this embodiment of the invention, a flexible rawhide strip is threaded through holes placed proximate to the perimeter of the edible panels. Alternate configurations may utilize an edible adhesive or flexible edible hinge. Other embodiments may be constructed of a single member having an indented, perforated or thinner hinge area positioned between two panel areas so that the single member may be folded alone, the flexible hinge.

In alternate embodiments, the greeting item may be suspended from a cage rail by a hook, wire or placed in a holder. This permits convenient positioning within a cage or stall, by mechanisms such as a clip having its free ends embedded in the panel, or a hook constructed of the edible materials which comprise the panel and which is formed integrally with the panel. Alternatively, a holder may be attached to the side of the cage or stall and the greeting card placed within the holder, the card resting on its supporting section.

BRIEF DESCRIPTION OF THE DRAWINGS

FIG. 1 is a perspective view of a preferred embodiment of the present invention;

FIG. 2 is a view of an alternate embodiment of the present invention;

FIG. 3 is a view of an embodiment of the present invention having a single panel;

FIG. 4A is a view of an alternate embodiment of the present invention having a cutout;

FIG. 4B is the rear view of the embodiment depicted in FIG. 4A;

DETAILED DESCRIPTION OF THE INVENTION

Figure 5A:
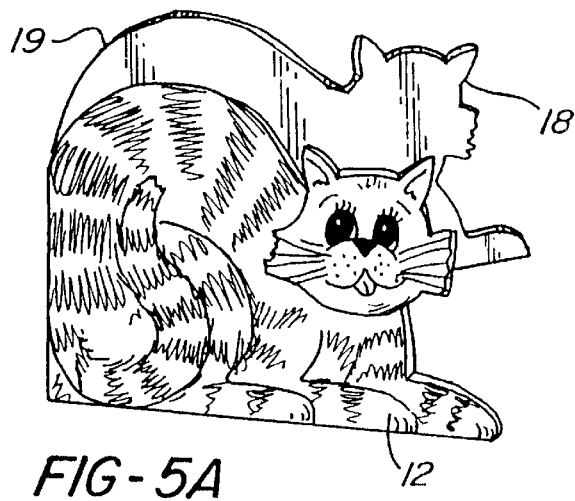
FIG. 5A is a view of another alternate embodiment of the present invention.

The present invention is broadly directed to greeting cards and other items to be enjoyed by animals and pets, including products that are suitable for chewing and/or ingestion. Thus, the term "edible" should include "non-toxic" as well as chewable and entirely consumable or digestible by the intended animal.

A preferred embodiment of the invention, shown generally at 10 in FIG. 1, includes a first edible panel 12 and a second edible panel 18, first panel 12 having a perimeter 13, interior surface 14 (see FIG. 5B), exterior surface 16, and a second panel 18 having a perimeter 19, interior surface 20 and exterior surface 22 (see FIG. 4B). In this embodiment the panels are preferably rectangular and flat, but may have rounded corners and assume other geometries, including non-planar designs.

Edible panels 12 and 18 may be joined by a variety of means to form a rigid edible greeting card which may be opened to view the interior surfaces 14 and 20 of panels 12 and 18, respectively. As shown in the embodiment depicted in FIGS. 5A and 5B, the perimeter 19 of second edible panel 18 is attached to perimeter 13 of first edible panel 12 via flexible edible hinge 26. In a preferred embodiment, hinge 26, comprised of rawhide, has a portion of its perimeter embedded in panels 12 and 18 which are, prior to solidification or hardening of panels 12 and 18, comprised primarily of grains. Alternately, a sticky substance such as molasses or corn syrup may be used as an edible adhesive, permitting the flexible edible hinge to be "glued" to the rigid edible panel.

In the embodiment of FIG. 1, first edible panel 12, edible hinge 26, and second edible panel 18 are formed from a single continuous material, such as a panel of rawhide. Hinge 26 preferably has a thinner cross-section than edible panels 12 and 18, giving edible hinge 26 increased flexibility while maintaining sufficient rigidity in edible panels 12 and 18.

Figure 7A:
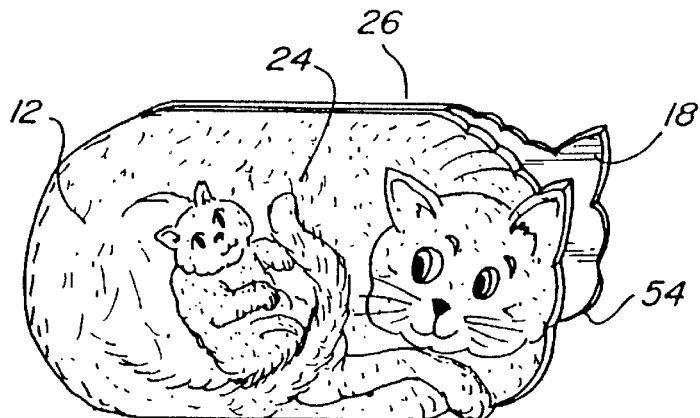
FIG. 7A is a view of an alternate embodiment of the present invention.
Figure 7B:
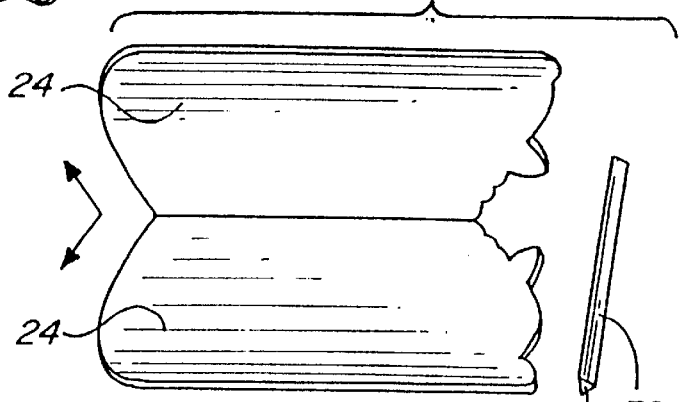
FIG. 7B is a view of the interior surfaces of the embodiment depicted in FIG. 7A.

In an alternate embodiment of the invention, as depicted in FIGS. 7A and 7B, an indentation or perforation may be formed in the continuous section of material between panels 12 and 18, forming their perimeters and hinge 26. The continuous material is then bent along the indentation, thus forming the card as depicted in FIGS. 7A and 7B. In a further alternate embodiment depicted in FIG. 2, panels 12 and 18 include a plurality of holes 29 positioned along a portion of respective perimeters 13 and 19. An edible stripe 28, preferably rawhide or other flexible edible material, is threaded through holes 29, thus joining edible panels 12 and 18.

Each greeting card 10 has at least one message region 24 positioned on at least one surface of at least one panel. An edible message 30 containing a plurality of characters such as letters, numbers, graphics, symbols or marks, may be placed within message region 24. The edible message preferably is an edible ink having ingredients selected from the group including corn syrup and glycerine. Nontoxic coloring agents such as FD&C certified colors, natural coloring agents and other ancillary ingredients such as catnip may be included in the edible ink.

A variety of printing techniques may be used to apply the characters of the edible message to the rigid edible panels, including silk screening, lithography, laser imprinting and embossing. The edible message may be formed of gum paste or other edible food decoration which may then be placed in the message region of the edible panel. Edible food decorations typically comprises ingredients including corn starch, corn syrup, sugar and glycerine. Gum paste typically comprises ingredients including gelatin, gum tragacanth, shortening and glucose. In selected embodiments such as those utilizing panels of rawhide or other suitable materials such and compressed grains and cereals, the message may be hot stamped into the rawhide utilizing a process similar to that used for imprinting leather goods. Lower-temperature embossing, molding, and so forth, may also be used to form the message, regardless of the underlying material. Alternate embodiments may first place the edible message on an edible decal, sticker, rice paper or wafer paper which is then applied to the message regions of the panels.

In the embodiments depicted in FIGS. 1–4, a supporting section 54 may be positioned along and attached to perimeters 13 and 19 of edible panels 12 and 18, thus permitting greeting card 10 to be set on a horizontal surface in the vicinity of the pet, such as the bottom of a cage, a floor or card holder. As depicted in the embodiment of FIG. 3, supporting section 54 is preferably thicker than panel 12, thus assisting greeting card 10 to remain in an upright, erect position on the horizontal surface.

Alternate embodiments may utilize a wire 60 embedded into edible panel 12 or other shaped item, allowing wire ends 62 to be wrapped around a rigid projecting member such as a cage bar or hook and suspended, in a cage, for example. The wire 60 may be provided as the sole means for placing the greeting in the vicinity of the pet, or may be used in conjunction with supporting section such as section 54. A supporting section 54 is preferably utilized for greeting cards ingested by horses, dogs and cats, while a wire 60 is preferably utilized for greeting cards ingested by birds or small mammals such as gerbils, hamsters and rabbits.

Figure 5B:
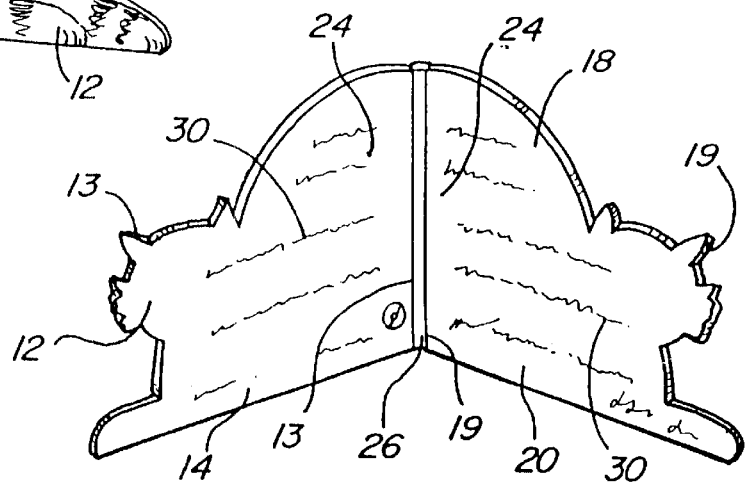
FIG. 5B is a view of the interior surfaces of the embodiment of the invention depicted in FIG. 5A.
Figure 12A:
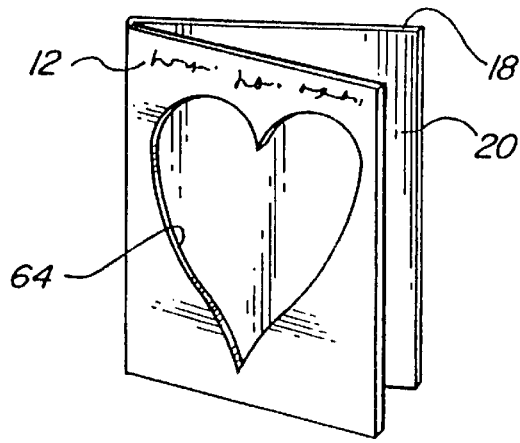
FIG. 12A is a view of an alternate embodiment of the present invention having a cutout.
Figure 12B:
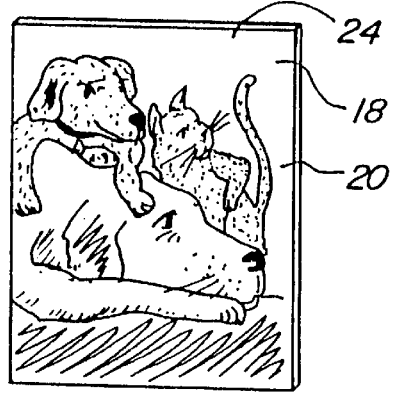
FIG. 12B is a view of an interior surface of the embodiment depicted in FIG. 12A.

The perimeters 13 and 19 of the edible greeting may be variously configured so as to provide a visually pleasing appearance. As depicted in FIG. 4A, first panel 12 is configured so that a portion of first panel 12 projects above second panel 18. As shown in FIG. 4B, the extending portion of FIG. 12 may be mirrored in a cutout 56 of panel 18. The perimeters and thickness of panels 12 and 18 may be configured so as to enhance the ability of the pet to ingest the greeting card 10. As shown in FIGS. 5A and 5B, messages 30 may be displayed in message region 24, on the interior surfaces 14 and 20 of panels 12 and 18.

As depicted in FIGS. 7A and 7B, some of the message regions 24 provided on greeting card 10 or other item according to the invention may be left blank so that the giver may personalize the item. In such cases a marker 32 may be provided which contains edible ink having ingredients selected from the group including corn syrup and glycerine. Nontoxic coloring agents such as FD&C certified colors, natural color additives and other ancillary ingredients such as catnip may be included in the edible ink. Marker 32 has a tip 33 configured to apply a line of edible ink onto message regions 24.

Figure 8:
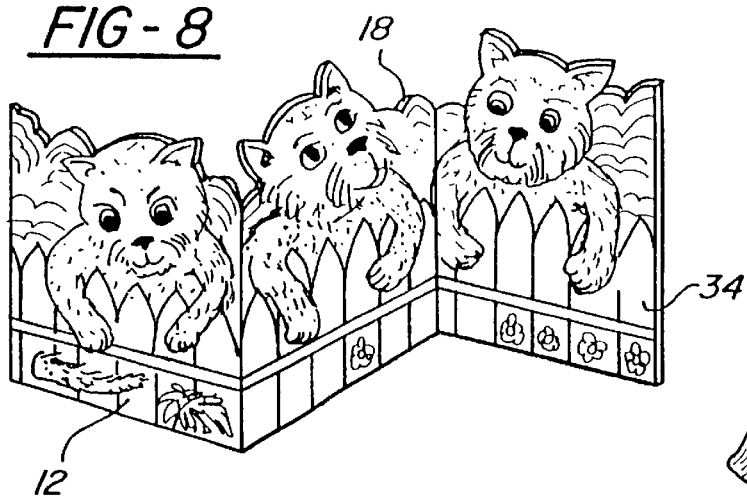
FIG. 8 is a view of an alternate embodiment of the present invention wherein three edible rigid panels are utilized.
Figure 9:
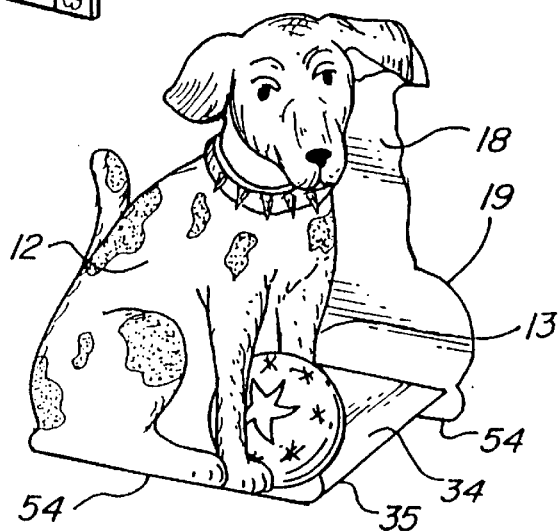
FIG. 9 is a view of an alternate embodiment of the present invention which utilizes three rigid edible panels.

FIG. 8 shows an alternate embodiment of the present invention wherein a third panel 34 is utilized in conjunction with first panel 12 and second panel 18, the panels being joined to create a tri-fold greeting card having, messages 30 displayed thereupon. An alternate embodiment of the present invention shown in FIG. 9 utilizes a third panel 34 to provide additional stability between first panel 12 and second panel 18, enabling greeting card 10 to stand upright on a horizontal surface. As shown in FIG. 9, supporting sections 54 are positioned along perimeter 13 of first panel 12, perimeter 35 of third panel 34, and perimeter 19 of second panel 18.

Figure 10A:
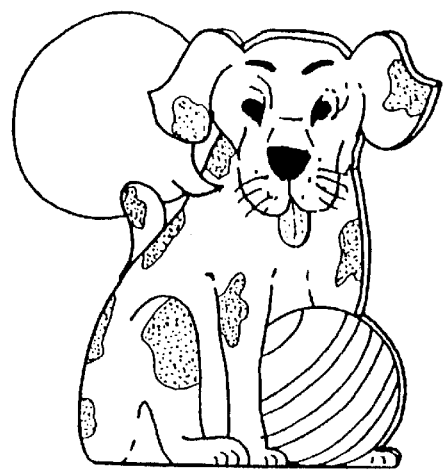
FIG. 10A is a view of another alternate embodiment of the present invention.
Figure 10B:
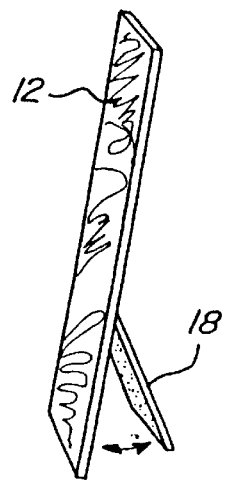
FIG. 10B is side view of the embodiment depicted in FIG. 10A.

The embodiments depicted in FIGS. 10A and 10B utilize second panel 18 primarily as a support for first panel 12. In this embodiment, message regions 24 are preferably only placed on panel 12. In the embodiment depicted in FIGS. 10A and 10B, a tab and slot arrangement may be utilized to attach first panel 12 and second panel 18.

Figure 11A:
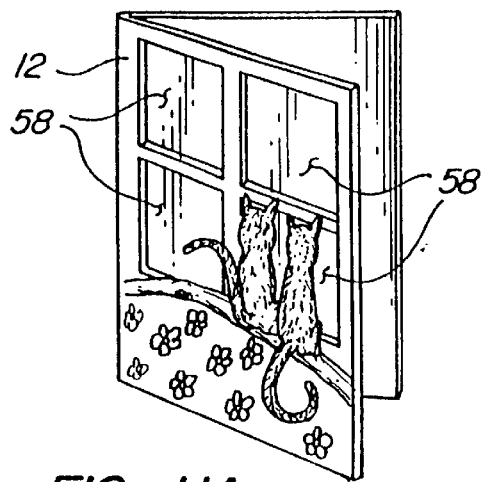
FIG. 11A is a view of an alternate embodiment of the present invention wherein a panel has a contoured exterior surface.
Figure 11B:
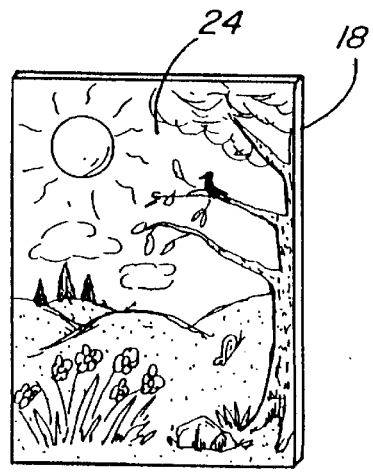
FIG. 11B is a view of an interior surface of the embodiment depicted in FIG. 11A.

As shown in FIG. 11A, cutouts 58 may be formed in first panel 12, enabling a viewer to see the interior surface 20 of second panel 18, shown in FIG. 11B. In the embodiment shown in FIG. 12A, first panel 12 may be sufficiently thick so as to enable a pattern having a depth to be integrally formed into first panel 12. The heart-shaped depression 64 may additionally be utilized as a message region 24. Depressions having a variety of shapes may be utilized, such as rectangles, ovals, and other geometric shapes.

Figure 6A:
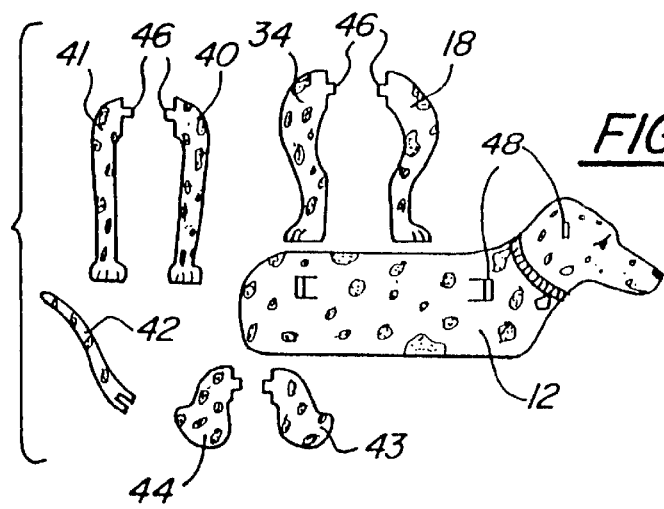
FIG. 6A is a view of an alternate embodiment of the present invention in a disassembled state.
Figure 6B:
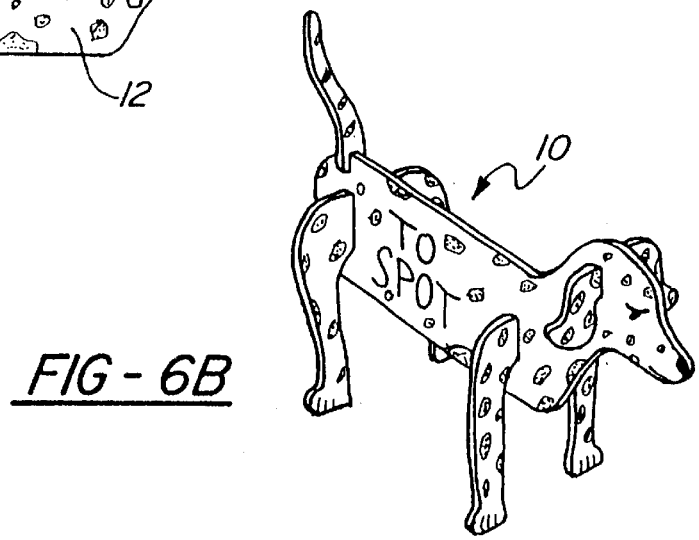
FIG. 6B is a view of the embodiment of FIG. 6A properly assembled.

An alternate embodiment of the invention, shown in FIGS. 6A and 6B, may include additional construction elements such as fourth panel 40, fifth panel 41, sixth panel 42, seventh panel 43 and eighth panel 44. The embodiment depicted in FIG. 6A is the unassembled version of the greeting, the various panels including tabs 46 and slots 48 which permit assembly of the various panels into the greeting card 10 depicted in FIG. 6B.

The thickness of the edible greeting card 10 or other elements will vary depending upon the materials used to construct the item and the type of animal to which the greeting is being sent. For example, panels such as 12 and 18 should be sufficiently thin to allow the receiving pet to bite and chew the panel. In a greeting card for a dog, for example, a preferred thickness is 0.25 inches, the thickness of such a card ranging between 0.125 inches for smaller dogs weighing under 20 pounds and 0.50 inches for larger dogs weighing over 65 pounds. For very large dog breeds weighing over 100 pounds, a thickness of greater than 0.50 inches may be preferred.

The thickness of a panel for felines is preferably in the range between 0.125 and 0.25 inches thick. Edible articles for birds preferably have thicknesses of approximately 0.25 inches for panels constructed of seeds and the like, while panel thicknesses of up to one inch or more may be acceptable for greetings constructed of minerals such as calcium sulfate. Greeting cards directed to horses are preferably constructed of panels having thicknesses of one inch and above.

While selected embodiments of the invention may be constructed of a single substance such as rawhide, alternate embodiments be constructed from a variety of ingredients including Nylabone, grains, minerals and seeds. The ingredients will generally vary depending on the animal for which the greeting is intended.

The greeting items may also include ancillary ingredients such as binding agents, vitamins, flavorings and colors to enhance the manufacturability, rigidity, palatability and nutritional value of the product. For example, agents which enhance the manufacturability or rigidity may include a leavening agent such as baking powder or baking soda, an anti-caking agent, a humectant, an emulsifier, a suspending agent or a wetting agent. Illustrative examples of lubricants or anti-caking agents which may be used in the invention include magnesium stearate, calcium stearate, solid polyethylene glycols, sodium lauryl sulfate, or mixtures thereof. Humectants illustratively include glycerol and propylene glycol, and wetting agents that may be included illustratively include cetyl alcohol and glycerol monostearate.

As used herein "a binding agent" may be a sticky substance or a substance which becomes sticky in combination with other ingredients such as water. For example, such agents may include molasses, corn syrup, peanut butter, food gum, a starch such as potato starch, tapioca starch or corn starch, honey, maple syrup and sugar. A preservative such as potassium sorbate, sodium benzoate or calcium propionate may be included in order to retard growth of microorganisms and fungi. It will be apparent to those skilled in the art that an ingredient may have multiple functions in the panel of the present invention. For example, honey may serve as both a binding agent and sweetener.

Vitamins may be provided according to the nutritional requirements of the target animal. A vitamin may be supplied an isolated relatively pure form, such as Vitamin A, Vitamin C, choline chloride, or as a known component of another ingredient of the article. For example, a fruit such as peach or pear, a vegetable, a grain, egg or meat containing a desirable vitamin may be included. As a more specific example, carrot, spinach or apple may be included to supply Vitamin A. Potato may be included as a source of Vitamin C. Vitamins are also present in various oils that may be added; illustrative examples of an oil that may be added include canola oil, corn oil, soybean oil and vegetable oil.

A flavoring agent may be added to enhance the palatability of the edible article and the choice of flavoring agent will again depend on the targeted animal. Illustrative examples of flavorings include anise oil, carob, peanuts, fruit flavors, sweeteners such as honey, sugar, maple syrup and fructose, herbs such as parsley, celery leaves, peppermint, spearmint, garlic, or combinations thereof.

Although rawhide is preferred for its structural and proteinaceous properties, particularly for canine recipients, other examples of desirable animal-derived ingredients include meat (including animal muscle, organ meats, as well as animal parts not typically consumed by humans such as bovine trachea) and meat by-products, and include food such as beef, pork, chicken, turkey, fish, lamb, organ meats such as liver, meat meals such as chicken, lamb and beef meals, fish meal, bone meals and ground bone. Animal-derived food such as casein, milk (which may include dry forms and lowered fat forms, such as dry skim milk), yogurt, gelatin, cheese and egg may also be used.

Further vitamin or nutritional supplements may include polysaccharides and fiber. A polysaccharide may be included in the form of a complex food such as a fruit, peanuts, a starch such as potato starch, potato flour, rice starch, tapioca starch, a modified food starch, or an animal source such as bovine cartilage in trachea. Polysaccharide may also provided separately, for example, in the form of chondroitin sulfate or glucosamine HCl. Fiber may be also provided in the form of a whole fruit, vegetable or seed or is provided separately in forms including wood fiber, paper fiber, fiberboard or cellulose fiber, such as powdered cellulose fiber.

Various grains may also be used, including corn, oats, rice (including white and brown rice), alfalfa, wheat, soy, barley, buckwheat, rye and combinations thereof. The grains may be present in in any form consistent with the production of the edible article including flour, bran, cereal, fiber, whole grain and meal forms, including gluten meals. Further, the form of the grain, such as rolled, crimped, ground, dehydrated or milled, will vary depending on the animal for which the article is intended and the requirements of the process by which the greeting card is manufactured. Grain may also be present in the form of an edible paper, such as rice paper. Seeds used in an edible article may include millet (including red and white forms), safflower, canary, milo, sunflower and flax.

Other additives may include calcium, limestone (which may be in ground form), salt. Specific examples may include calcium sulfate, calcium phosphate, dicalcium phosphate, calcium carbonate and combinations thereof.

If the card or other article is intended for ingestion by a horse, oats, corn, wheat, soy, alfalfa or combinations thereof my preferably be included, for example in the from of rolled or crimped oats. The product may additionally include a binding agent such as molasses, and vitamin additives and minerals such as salt or ground limestone may be added to enhance the nutritional value or palatability.

Greeting cards or other articles intended for small mammals such as rabbits, hamsters, gerbils, and guinea pigs may preferably include an ingredient such as alfalfa, corn, rice and combinations thereof. Preferably, the grain utilized is dehydrated, milled or flaked. Vegetables such as dehydrated carrots and seeds such as safflower seeds or milo seeds are preferably included as additives for small mammals.

For greeting cards and articles intended for birds, the ingredients might include corn, millet, alfalfa and combinations thereof, as well as a mineral or compound such as calcium, calcium sulfate, salt, magnesium, ferrous carbonate, zinc oxide, and combinations thereof. A mineral may be included as a complex source, such as liver where liver is known to be a source of iron, or as a relatively pure, isolated mineral source. Cuttlebone is a preferred natural source of minerals and is especially suitable for birds. Traditional paper may also be included for birds and other small animals.

If the greeting card or article is intended for feline, the item may include a grain such as corn, wheat, rice and combinations thereof. For example, ground yellow corn may used separately or together with poultry by-products, fish meal, catnip or fish oil. Catnip may provided in a liquid or flake form, and may be applied or refilled by the pet owner. Particularly in the case of cats, the item may not be technically "edible," though the use of catnip, for example, in conjucntion with textual or graphical message would clearly fall within the spirit and scope of this invention.

If the recipient is a canine, rawhide is the preferred choice for panels of a greeting card, as discused above. Alternate ingredients may include corn, wheat, rice and combinations thereof. Alternate ingredients may be particularly chosen to meet the special dietary needs of selected groups of dogs, such as dogs having food allergies and weight problems. For example, a greeting having lamb and rice as the primary ingredients are suitable for dogs having food allergies.

I claim:

1. An edible greeting for a dog, comprising:
   an article composed of a chewable or consumable material that is non-toxic to a dog;
   wherein the material includes an animal-derived food, a grain, a vitamin source, a mineral, a fiber source, a binding agent, a seed, a flavoring, an ancillary ingredient, or a combination thereof, and the animal-derived food is rawhide, meat, fish, poultry, bone meal, casein, yogurt, milk, gelatin, cheese, egg, or a combination thereof;
   a graphical image of dog; and
   a textual greeting.

2. The article of claim 1, wherein the textual greeting is associated with a holiday, the dog's birthday, or another special occasion or event.

3. The article of claim 1, wherein the article includes one or more panels, each panel having a thickness of an inch or less.

4. The article of claim 1, wherein the grain is corn, oats, rice, alfalfa, wheat, soy, barley, buckwheat, rye, or a combination thereof.

5. The article of claim 1, wherein the seed is flax, sunflower, millet, safflower, canary, milo, or a combination thereof.

6. The article of claim 1, wherein the textual greeting refers to the graphical image.

7. The article of claim 1, wherein the graphical image, textual greeting, or both, are formed with an edible ink, embossed, or molded.

8. The article of claim 7, wherein the edible ink is provided from a separate marking implement.

9. An edible greeting for a cat, comprising:
   an article composed of an attracting, chewable or consumable material that is non-toxic to a cat;
   wherein the material includes an animal-derived food, a grain, a vitamin source, a mineral, a fiber source, a binding agent, a seed, a flavoring, an ancillary ingredient, or a combination thereof, and the animal-derived food is rawhide, meat, fish, poultry, bone meal, casein, yogurt, milk, gelatin, cheese, egg, or a combination thereof;
   a graphical image of cat; and
   a textual greeting.

10. The article of claim 9, wherein the textual greeting is associated with a holiday, the cat's birthday, or another special occasion or event.

11. The article of claim 9, wherein the article includes one or more panels, each panel having a thickness of an inch or less.

12. The article of claim 9, wherein the grain is corn, oats, rice, alfalfa, wheat, soy, barley, buckwheat, rye, or a combination thereof.

13. The article of claim 9, wherein the seed is flax, sunflower, millet, safflower, canary, milo, or a combination thereof.

14. The article of claim 9 wherein the textual message refers to the graphical image.

15. The article of claim 9, wherein the graphical image, textual greeting, or both, are formed with an edible ink, embossed, or molded.

16. The article of claim 15, wherein the edible ink is provided by a separate marking implement.

17. An edible greeting for a cat, comprising:
   an article including a graphical image of a cat, a textual greeting, or both; and
   an amount of catnip carried by the article.

* * * * *